May 31, 1966    H. A. McINTOSH    3,254,272
MACHINE SAFETY CONTROL APPARATUS
Filed March 26, 1962    2 Sheets-Sheet 1

INVENTOR
HAROLD A. McINTOSH

BY Mead, Browne, Schuyler & Beveridge
ATTORNEYS.

May 31, 1966     H. A. McINTOSH     3,254,272

MACHINE SAFETY CONTROL APPARATUS

Filed March 26, 1962     2 Sheets-Sheet 2

INVENTOR
HAROLD A. McINTOSH

BY Mead, Browne, Schuyler, & Beveridge
ATTORNEYS.

United States Patent Office 3,254,272
Patented May 31, 1966

3,254,272
MACHINE SAFETY CONTROL APPARATUS
Harold A. McIntosh, 517 Floral Park Terrace,
South Pasadena, Calif.
Filed Mar. 26, 1962, Ser. No. 182,549
8 Claims. (Cl. 317—157)

This invention relates to safety control apparatus for automatic production machines and more particularly to an electrical circuit for protecting the machine on failure of the machine to complete a prescribed cycle of operation.

In high speed automatic production machines, as for example automatic punch presses, the conventional operation of such machine consists of a repeating cycle of operations such as movement and retraction of the ram towards the stationary bed plate of the press, infeed of work material, outfeed of the work products, etc. It is essential in such machines that this cycle of operations be maintained to protect the machine from malfunction and damage. For example, expensive die sets or other devices on the stationary bed plate of a press and on the ram itself may be seriously damaged should a part fail to eject at the proper time during the cycle of operation of the machine, as well as shutting down the operation of the machine until the damaged part can be repaired or replaced.

It is an object of the invention to provide a safety control circuit for automatic machines and the like effective to disable the machine on failure of the machine to perform a complete cycle of operation.

Another object of this invention is to provide a safety control apparatus for automatic machines which may be easily adapted to any machine having a repeating cycle of operation.

Another object of this invention is to provide safety control apparatus for punch presses and the like machines wherein the condition of the work or work product in the machine is utilized for controlling subsequent cycling thereof.

The invention will be described in connection with automatic production machines and particularly punch presses and the like having an automatic feed for the work and automatic ejection of the work product. It will be apparent however that the invention is applicable to many other forms of automatic production machines and the punch press environment disclosed herein is merely exemplary.

The invention includes a machine control circuit having a first electrical switching means for conditioning the circuit for operation by a second electrical switching means during the normal operation of the machine and for disabling the machine on failure of operation of the second electrical switching means during operation of the first electrical switching means. Moreover, the control circuit features a self-clearing ground control which allows overriding disablement or interruption of operation of the machine by actuation of a reset switch after the cause of interruption has been removed.

The above-mentioned other features and objects of this invention will become more apparent from the following description and accompanying drawings wherein.

Figures 4A, 4B, 4C, 4D, 5:
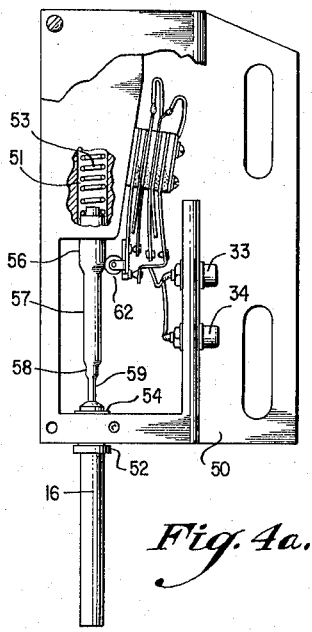
FIGS. 4a to 4d illustrate one form of control switch adapted for use with the circuits shown in FIGS. 1, 2 and 3 in various positions of actuation.
FIG. 5 is a diagrammatic illustration of the various components of the invention associated with an automatic punch press.

Referring to FIG. 5 of the drawings, a press, diagrammatically illustrated, generally comprises a bed member 10 above which is reciprocally supported a press ram 11. Mounted on the lower part of the ram 11 and on the upper part of the bed member 10 are working members such as punch and die sets, or forming dies which are brought together by reciprocation of the press ram in order to pressure form, blank, punch or draw a work piece 12. Normally, the press ram 11 is reciprocated by means of a crankshaft (not shown) which is driven from a flywheel through a controlled clutch mechanism (not shown).

Figure 2:
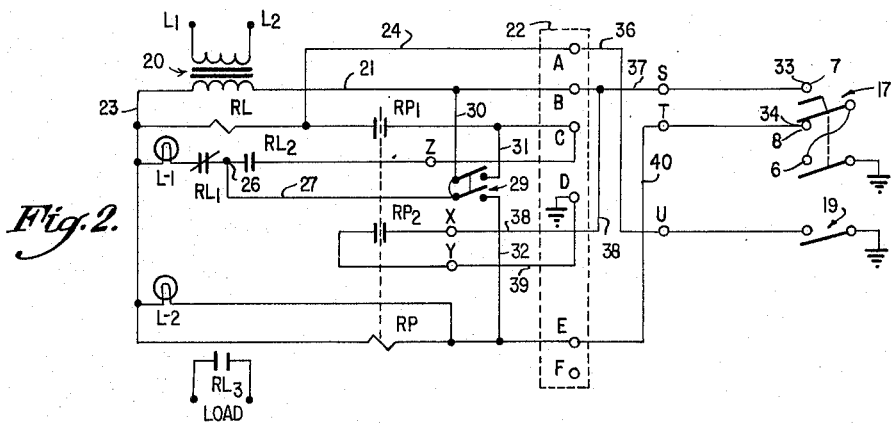
FIG. 2 is a circuit diagram illustrating the basic circuit of FIG. 1 as connected for operation with an intermittent or dog clutch type machine.

In general, there are two main types of automatic machine clutches. The first and more common type is the dog type clutch where the clutch of a press, for example, is engaged and released by simple interference and clearance of the clutch dogs. At the 12 o'clock position the clutch is released from the shaft allowing the flywheel to turn independent of the crank shaft of the press. When the clutch dog is released, the clutch engages the crank shaft and drives the press ram through its cycle. The ram will continue to cycle as long as the clutch dog remains in the clear. If the clutch dog returns to its interference position, the clutch will release the flywheel from the crank shaft and the press will stop at the top position of the ram stroke. In order to accomplish this the clutch mechanism must ordinarily be operated by the time the ram has moved up approximately half way on the up-stroke, the exact position varying with the condition of the press, the speed of the press and the speed of operation of the clutch mechanism. With this type of clutch it is always necessary that the press be stopped before it reaches the 12 o'clock position, which is the top of the up-stroke of the ram. The circuit illustrated in FIG. 2 is intended to be used for this type of operation.

Figure 3:
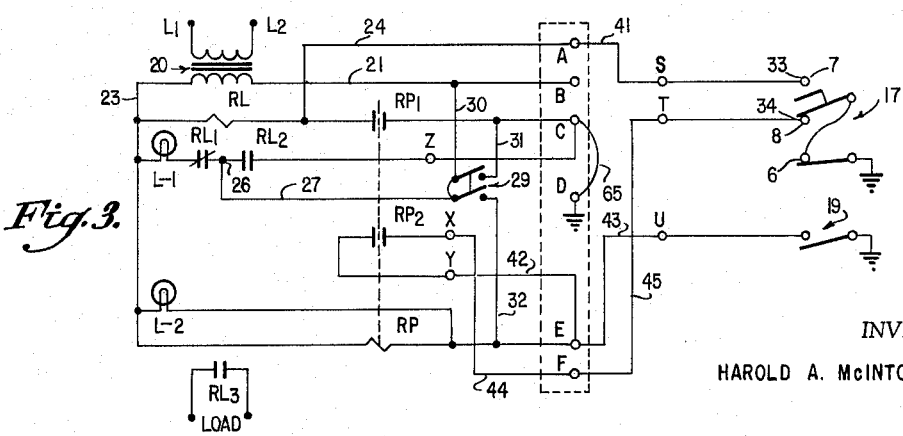
FIG. 3 is a circuit diagram showing the connections of FIG. 1 for a continuous or air clutch type machine.

The second type of press utilizes a so-called "air clutch." This clutch is capable of stopping the press in any position throughout the cycle and therefore grants more time for response to the ejected part or work product signal than in the case of the dog type clutch. In the air clutch type press, the press operates continuously without any cycling of the clutch and the clutch is held in the engaged position. The circuit illustrated in FIG. 3 is adapted for operation with this type of clutch.

A member 14 reciprocal with the ram 11 of the press actuates plunger 16 of phase or control switch 17. Phase switch 17 is a conditioning and control device for the control circuit illustrated in FIG. 1 and enclosed within control box 18 of FIG. 5. A detector or sensing device 19 is located on the downstream side of the press carries a plurality of actuating fingers 20 interposed in the path of work product 12 as said work product leaves the press. As will appear more fully hereinafter failure of the work product to operate detector switch 19 at the proper time in a cycle of operation of the ram 11 is effective to disengage the clutch of the press, whether it be of the intermittent type or of the continuous type all as described above.

Figure 1:
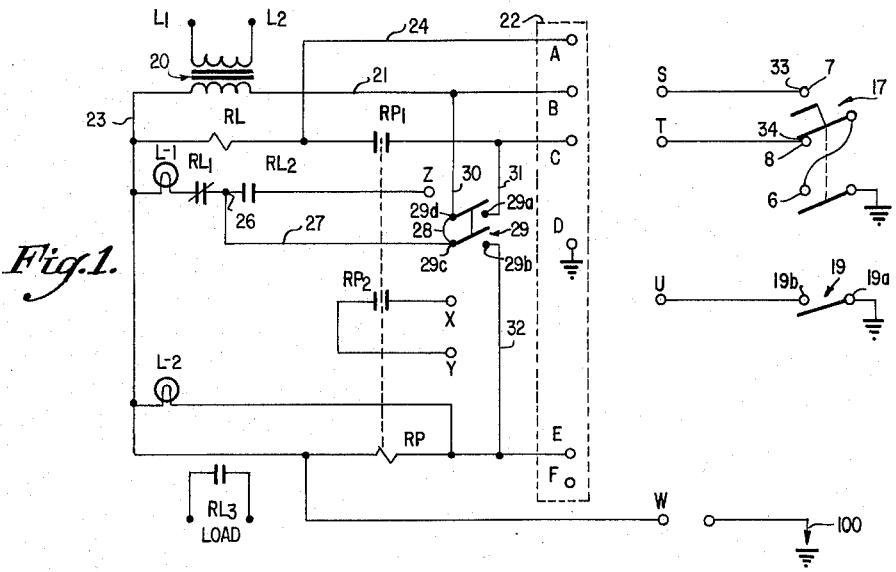
FIG. 1 is a circuit diagram of the basic circuit of the invention with several connections for adapting the circuit to different modes of operation omitted.

As shown in FIG. 1, a step-down transformer 20 supplies power to the control circuit contained within control box 18 illustrated in FIG. 5. One side of the secondary winding of transformer 20 is connected through conductor 21 to terminal B of terminal strip 22. The other side of the secondary winding is connected to a buss 23 for supplying operating voltage to the rest of the circuit. Load relay RL has its operating winding connected between conductor buss 23 and terminal strip 22 through the normally open contacts RP–1. The operating coil of load relay RL is also connected between conductor buss 23 and terminal A on terminal strip 22 through a conductor 24. An indicator lamp L–1 is connected through back contacts RL–1 of load relay RL and indicates the condition of load relay RL. When lamp L–1 is on, relay RL is de-energized. When relay RL is energized, lamp L–1 is off. The junction 26 between normally closed contact RL–1 and normally open contact RL–2 is connected by a conductor 27 through a jumper 28 on reset switch 29 and conductor 30 to the secondary of transformer 20 and also terminal B. Reset switch 29 is a double pole single throw switch (DPST) the purpose of which will be described more fully hereinafter. Contact 29a of this switch is connected through conductor 31 to terminal C of terminal strip 22. Contact 29b of reset switch 29 is connected through conductor 32 to terminal E on terminal strip 22. The winding of pilot relay RP is connected between conductor buss 23 and terminal E on terminal strip 22 and has in parallel therewith an indicator lamp L–2 which indicates the condition of pilot relay RP. Pilot relay RP, when energized, closes its normally open contacts RP–1 and RP–2. Contacts RP–2 are connected across auxiliary terminals X and Y respectively. Terminal D of terminal strip 22 is normally grounded to housing 18.

Detector switch 19 includes one or more switch blades each having a common contact element and a plurality of individual contact elements any one of which may be closed by a work product issuing from the press. This switch is in effect a plurality of parallel connected single pole single throw switches and is illustrated as a single switch in FIGS. 1, 2 and 3. One side of the switch is grounded to the frame of the machine as at 19a. The other side 19b of switch 19 is connected to auxiliary terminal U and, depending upon the type of operation desired, to terminal A (FIG. 2) or terminal E (FIG. 3) of terminal strip 22. The details of the construction of this detector switch is shown and described in the application of Herrera et al. filed November 1, 1961, having Serial No. 149,346, assigned to the assignee of the present invention.

Phase switch 17 includes a pair of make-before-break-switch elements commonly operated from stepped plunger 16 as shown in FIGS. 4a to 4d. The switch action is so arranged that contact 6 operates as a limit switch and contacts 7 and 8 operate as the controlling or conditioning switches. The sequence of operation of this switch on a downward stroke of plunger 16 is as follows: First contact 6 closes; then, contact 7 closes while contact 8 remains closed; further travel of the plunger 16 opens contact 8. On the reverse stroke, the sequence is reversed. However, for a particular mode of operation described below the frame of phase switch 17 may be shifted so that contact 6 is at all times closed.

As shown in FIGS. 4a to 4d inclusive, phase switch 17 comprises a frame 50 adapted to be secured and electrically grounded to the machine. Plunger 16 is reciprocated in bore 51 and bushing 52 by member 14 (FIG. 5) is urged outwardly by spring 53. Stop 54 on plunger 16 limits outward movement thereof. Plunger 16 includes a plurality of steps 56, 57, 58 and 59 which control the actuation of contact elements 6, 7 and 8 through movement of spring contact arm 61 which is electrically connected to frame 50. Roller 62 riding on step plunger 16 effects the opening and closing of contacts 6, 7 and 8 according to the position of the press ram and accordingly the position of the steps 56, 57, 58 and 59. It will be noted that step 57 provides a dwell period between the closing of contact 7 and the opening of contact 8. Thus, the circuit is effectively locked in with the timed operation of the machine without any further outside agency. A more detailed description of phase switch 17 is given in the application of Richard F. Gildart filed March 30, 1962, having Serial No. 183,822, and assigned to the assignee of the present invention.

In FIGS. 1, 2 and 3, the terminals 33 and 34 are directly connected to auxiliary terminals S and T on phase switch 17.

For the purposes of explanation, connections between auxiliary terminals X, Y and Z, and terminals S, T and U and A, B, C, D, E and F were omitted from FIG. 1, these connections being shown in FIGS. 2 and 3. Referring now to FIG. 2, terminal A on terminal strip 22 is connected by a conductor 36 directly to auxiliary terminal U on the switch 19. Also, auxiliary terminal X is connected to terminal B by a conductor 38. Auxiliary terminal Y is directly connected to ground terminal D through conductor 39, while auxiliary terminal T on phase switch 17 is directly connected to terminal E through conductor 40.

With the connections between terminals on terminal strip 22 and the auxiliary terminals S, T, Z, U, X and Y as just described, the circuit shown in FIG. 2 is effective to control an intermittently operated clutch as for example a dog type clutch. The circuit operates as follows: Assume that relay RL has been de-energized to open its contacts RL–3 in the circuit to the clutch solenoid so that the clutch is disengaged and the press ram is stationary. When momentary contact reset switch 29 is closed, pilot relay RP is energized through conductor 32, reset switch 29 and conductor 30. Energization of pilot relay RP closes its contacts RP–1 and RP–2 respectively. In addition, load relay RL is energized through the now closed contacts RP–1 conductor 30, switch 29 and conductor 31 and initiates the first cycle of operation of the press by closing contacts RL–3 which are in circuit with the clutch solenoid which starts the press stroke. Member 14 on the press ram moves stepped plunger 16 from position shown in FIG. 4b to close limit switch 6, as shown in FIG. 4c and thus establish ground through the phase switch. In addition, ground contact has been established through terminal B, conductor 38, the now closed contacts of RP–2, conductor 39 and terminal D. Load relay RL is maintained energized through the closed contacts RP–1 of the pilot relay RP, the now closed contacts RL–2, conductors 27, 28 and 30. As the ram continues its downstroke, the stepped plunger 16 is moved to a new position to first close contact 7 and then open contact 8. This de-energizes pilot relay RP opening its contacts RP–1 and RP–2, which, in turn de-energize the load relay RL. This opens contact RL–3 in circuit with the clutch solenoid, de-energizing the clutch solenoid to allow the clutch dog to drop into position for stopping the press. As the cycle continues and the press ram 11 begins its up-stroke, plunger 16 closes contact 8 and leaves contact 7 closed during the dwell period of step 57. The pilot relay RP is re-energized through conductor 37, switches 7 and 8, phase switch 17 and conductor 40. If the detector switch 19 is actuated by the ejected work product during this condition, the load relay RL is re-energized and maintained through contacts RP–1 and RL–2, conductor 27, jumper 28 and conductor 30 to the secondary winding of step-down transformer 20. When load relay RL is re-energized, its contacts RL–3 close to energize the clutch solenoid and pull the clutch dog out of position to clear the press for another cycle. However, if the part does not eject and the detector switch 19 is not closed, then as the cycle progresses, contact 7 on the phase switch opens. This opens the direct circuit from the transformer secondary so that when switch 6 opens it causes relay RP to be de-energized. Thus, detector switch 19 must be operated when switches 6 and 8 of the phase switch are closed. As the press aprroaches the top of its stroke, switch 6 will open de-energizing relay RP to isolate the control circuit from ground and the press cannot be restarted until the reset switch 29 is actuated.

FIG. 3 illustrates a different connection of the circuit illustrated in FIG. 1 wherein the circuit is adapted for use with a so-called continuously operated clutch. According to this circuit, terminal A of terminal strip 22 is connected by a conductor 41 to auxiliary terminal S on phase switch 17. Auxiliary terminal Y is connected to terminal E by a conductor 42 while terminal E is connected by a conductor 43 to auxiliary terminal U on the detector switch 19. Auxiliary terminal X is connected to terminal F on terminal strip 22 by a conductor 44, and terminal F is directly connected to auxiliary terminal T on phase switch 17 by a conductor 45. Terminal C is connected to terminal D by a jumper 65. As thus connected, the circuit of FIG. 3 operates as follows: Assuming again that the press has been disabled through de-energization of load relay RL and its contacts RL-3 in circuit with the clutch solenoid. When momentary contact reset switch 29 is closed, pilot relay RP is energized through conductor 32, the reset switch 29 and conductor 30. Likewise, load relay RL is energized through conductor 31 and the now closed contacts RP-1. As noted earlier, the phase switch 17 has been physically positioned on the frame of the press so that contact 6 is closed at all times and is not open during any part of the operation of the press as shown in FIG. 4c. The first step of the plunger 16 serves to close contact 7, leaving contact 8 closed and at the same time establishes a holding circuit for pilot relay RP. With load relay RL energized, contact RL-2 is closed to provide continuity to ground to terminal D. Pilot relay RP is maintained energized through contact 8 on phase switch 17 and terminal F and closed contacts RP-2 of pilot relay RP. The last step on plunger 17 opens contact 8 which de-energizes pilot relay RP. However, contact 7 on the phase switch 17 maintains the load relay RL energized through conductors 24 and 41. As the ram continues its cycle, contact 8 recloses but is ineffective at this time since contact RP-2 of the pilot relay RP is open. If the ejecting part 12 closes the detector switch 19 before contact 7 has opened, pilot relay RP will be energized and will establish through its contact RP-1 a holding circuit for the load relay RL and will continue to hold the load relay RL energized into the next cycle. However, if detector switch 19 does not close before contact 7 opens, then the load relay RL will be de-energized and contacts RL-3 of the load relay RL open to de-energize the press clutch solenoid. When this occurs the connection to ground is broken so the circuit is locked out and can only be restarted through the reset swtich 29.

Pilot lights L-1 and L-2 indicate the sequencing operation of the relays RL and RP respectively. Lamp L-1 always indicates that the load circuit is open and lamp L-2 indicates that the pilot relay is energized. In the case of the circuit illustrated in FIG. 2, lamps L-1 and L-2 will often flash on and off throughout the operation. But when the press stops, the lamp L-1 will remain on indicating that a reset operation is necessary to restart operation of the press. In the circuit illustrated in FIG. 3, once the press is in operation, lamp L-1 will remain off and lamp L-2 will intermittently flash on and off throughout the operation. However, as in the case of the circuit as shown in FIG. 2, when the press stops, lamp L-1 will remain on and indicate that a reset operation is necessary.

With respect to the circuit connections shown in FIG. 2, it will be noted that if the detector switch 19 is not operated at the correct time in the cycle of operation of the press, e.g., during the dwell of step 57 on plunger 16 during the upstroke of the ram, subsequent operation thereof has no effect on the operation of the machine. However, if detector switch 19 does not close before contact 7 opens, then the load relay RL will be de-energized and contacts RL-3 of the load relay RL opened to de-energize the press clutch solenoid. When this occurs, the connection to ground is broken so that the circuit is locked out and can only be restarted through the reset switch 29, as described earlier herein. In the case of the circuit shown in FIG. 3, the phase switch 17 is adjusted so that lock out occurs when roller 62 reaches step 58, while in the top position of the plunger for which the phase switch is adjusted and corresponds to the top position of the ram. It will be noted that reset switch 29 is connected in series with pilot relay RP and the secondary winding of transformer 20 through its contacts 29a and 29b and conductors 30 and 32. In addition, these contacts are in shunt with auxiliary terminals S and T on phase switch 17. This is an important safety feature in that when the control is locked out, no external short circuiting can possibly override the lock out. In addition, it is important to note that the circuit shown in FIGS. 2 and 3 assures a positive relationship between the position of the press cycle and the lock out point of the system and has no dependence upon a time mechanism or any other secondary control feature.

It will be appreciated that energization of relay RL, in both the circuit shown in FIG. 2 and the circuit shown in FIG. 3, closes contact RL-3 in circuit with the clutch solenoid. This will cause the clutch to effect engagement between the press and the flywheel and to release the brake. De-energization of the relay RL effects disengagement of the press and the flywheel and sets the brakes. This is true whether the clutch-brake mechanism is of the so-called "dog" clutch type (intermittent) or is an "air" clutch (continuous).

Referring again to FIG. 1, it will be noted that auxiliary terminal W is connected to the common side 23 of the secondary winding of transformer 20. Any grounding probe or switch may be connected to terminal W to effect control of the circuit. Thus, an end of material probe or switch 100 may be connected to terminal W. As shown in FIG. 1, switch 100 is normally held open by the presence of material being fed into the machine. Alternatively, the switch may be controlled by buckling of the material, etc.

While I have shown and described two embodiments of my invention, it will be appreciated that numerous modifications and changes may be made thereto without departing from the scope of the invention. Accordingly, it is desired to comprehend such modifications within this invention as may fall within the scope of the appended claims.

I claim:

1. A control circuit for a machine having a repeating cycle of operation comprising a source of electrical current having a ground terminal, a circuit conditioning switch means actuated by the machine during a portion of a cycle thereof including a pair of serially connected sequentially actuated make-before-break-switch elements, means connecting said break switch element to said ground terminal, a pilot relay energized from said source through said switch elements, second switch normally open means, normally operated closed on successful completion of a portion of the machine cycle and during said portion of a cycle of the machine during which said conditioning switch is actuated and during the period when said make switch element is made and before said break switch element is broken, said second switch means being connected in circuit with said pilot relay and when operated energizes said pilot relay and maintains the energization thereof during the time it is operated closed, a load circuit energized by said pilot relay, and reset switch means connected between said relay and said source for bypassing said make-before-break-switch elements and said second switch means, effective to energize said relay when said second switch is not operated during the said period of operation of said circuit conditioning switch means.

2. A control circuit as defined in claim 1 including a further switch element in series with said make-before-break-switch elements operated by the machine after operation of said make-before-break-switch elements to prevent energization of said control circuit through said ground terminal.

3. A control circuit as defined in claim 2 wherein said reset switch means shunts said further switch element.

4. A control circuit for a machine having a repeating cycle of oepration comprising a source of electrical power, a circuit conditioning switch means operated by said machine during a portion of a cycle thereof including a pair of sequentially actuated make-before-break-switch elements, a first relay energized from said source through said switch elements when said make switch element is made and said break switch element is broken, a second relay, a second normally open switch means normally operated closed during a preselected portion of a cycle of the machine and being connected in circuit with said second relay and said source so that when operated it energizes said second relay, said second relay thereupon being continued in an energized condition by a switch of said first relay, and a load circuit energized by said second relay to allow continued cycling of said machine on completion of said preselected portion of the machine cycle.

5. A control circuit as defined in claim 4 including a further switch element in series with said make-before-break-switch elements operated by the machine at a different portion of the cycle thereof for isolating the said make-before-break switch elements at said source.

6. Safety and control apparatus for a machine having a repeating cycle of operation as defined in claim 4 including switch means for short circuiting said source of electrical power to de-energize the said control circuit.

7. A control circuit for a machine having a repeating cycle of operation comprising a source of electrical power, first and second relays, a circuit conditioning switch operable during the cycle of the machine, said circuit conditioning switch including a pair of sequentially actuated make-before-break switch elements connecting the coil of said first relay and the coil of said second relay to said source and for continuing the energization of said second relay during the portion of the cycle during which the make switch element is made and after said break switch element is broken, said break switch element de-energizing said first relay when broken, a maintaining contact on said first relay, means connecting said break switch element in series with said maintaining contact of said first relay, second switch means normally operated during a portion of a cycle of the machine during which time said make switch element is made and before the break switch element is broken to energize said first relay by momentary contact, a second contact on said first relay for continuing energization of said second relay during the portion of the cycle when said make switch element is broken, and a load circuit energized by said second relay to continue operation of the machine.

8. A control circuit as defined in claim 4 including a normally open reset switch connected between said source and said first relay for energizing said first relay when operation of the machine has been interrupted by failure of the machine to complete said preselected portion of its cycle.

References Cited by the Examiner
UNITED STATES PATENTS

| | | | |
|---|---|---|---|
| 2,624,850 | 1/1953 | Vaughan | 307—106 |
| 2,702,189 | 2/1955 | Zugel et al. | 192—127 X |
| 2,802,154 | 8/1957 | Bonn et al. | 317—123 |
| 2,860,263 | 11/1958 | Sparrow | 307—140 |
| 3,015,977 | 1/1962 | Stegink et al. | |

SAMUEL BERNSTEIN, *Primary Examiner.*

LLOYD McCOLLUM, *Examiner.*

DONALD YUSKO, *Assistant Examiner.*